United States Patent [19]

van Heerden et al.

[11] Patent Number: 4,939,683

[45] Date of Patent: Jul. 3, 1990

[54] METHOD AND APPARATUS FOR IDENTIFYING THAT ONE OF A SET OF PAST OR HISTORICAL EVENTS BEST CORRELATED WITH A CURRENT OR RECENT EVENT

[76] Inventors: Pieter J. van Heerden, 18217 145th Court N. E., Woodinville, Wash. 98072; Robert J. Marks, II, 1131 - 199th St., S. W., Lynwood, Wash. 98036; Oh, Seho, 4747 30th Ave., N. E. #K173, Seattle, Wash. 98105

[21] Appl. No.: 355,202

[22] Filed: May 19, 1989

[51] Int. Cl.[5] .......................................... G06F 15/336
[52] U.S. Cl. ........................... 364/715.11; 364/728.03
[58] Field of Search ....................... 364/728.03, 728.06, 364/724.11, 715.11; 382/42

[56] References Cited

U.S. PATENT DOCUMENTS

| | | | |
|---|---|---|---|
| 3,296,594 | 1/1967 | Van Heerden | 364/900 |
| 3,492,652 | 1/1970 | Van Heerden | 364/900 |
| 3,950,733 | 4/1976 | Cooper et al. | 364/900 |
| 4,032,885 | 6/1977 | Roth | 364/715.11 |
| 4,205,302 | 5/1980 | Godo | 364/715.11 |
| 4,227,175 | 10/1980 | Newman | 364/715.11 |
| 4,414,641 | 11/1983 | Jarrett | 364/728.06 |
| 4,559,606 | 12/1985 | Jezo et al. | 364/728.06 |
| 4,591,983 | 5/1986 | Bennett et al. | 364/403 |
| 4,599,692 | 7/1986 | Tan et al. | 364/513 |
| 4,642,782 | 2/1987 | Kemper et al. | 364/550 |
| 4,670,848 | 6/1987 | Schramm | 364/513 |
| 4,675,829 | 6/1987 | Clemenson | 364/513 |
| 4,697,242 | 9/1987 | Holland et al. | 364/513 |
| 4,704,695 | 11/1987 | Kimura et al. | 364/513 |
| 4,713,775 | 12/1987 | Scott et al. | 364/513 |

OTHER PUBLICATIONS

Eldon, "A 20MHz Single-Chip Digital Correlator" *Electronic Engineering*, Mar. 1981, pp. 41–49.
Van Heerden, "The Foundation of Empirical Knowledge" *N. V. Vitgeverij Wistik-Wassenaar*, the Netherlands 1968.

*Primary Examiner*—David H. Malzahn
*Attorney, Agent, or Firm*—Hughes & Multer

[57] ABSTRACT

Methods and systems that employ electronic data processing to identify a set of data which can be outputted to a mechanical, electromechanical, electronic, or other device to optimize the performance of that device. The data to be outputted is identified by writing a function which represents a current event or situation as a string of binary digits, finding that one of a series of functions similarly representing past or historical events which is most closely correlated with the current event-representing function, and outputting the string of digits representing the thus identified historical event. The functions representing historical events can be derived from the function representing the current event or from information supplied from a separate source. The system includes delay circuits for generating the historical event-representing strings of digits, circuits for adding the string of digits representing the current situation to the string of digits representing each of the historical events by modulo two addition and counting the number of excess zeros in each resulting sum, a single elimination array of comparators for matching successive pairs of sum-representing strings of digits in enough levels to identify that string of digits with the largest number of excess zeros, and circuitry for: converting the winning string of digits back to the format in which the associated historical event is represented and outputting the string of digits in that format.

13 Claims, 3 Drawing Sheets

4,939,683

METHOD AND APPARATUS FOR IDENTIFYING THAT ONE OF A SET OF PAST OR HISTORICAL EVENTS BEST CORRELATED WITH A CURRENT OR RECENT EVENT

TECHNICAL FIELD OF THE INVENTION

In one aspect, the present invention relates to novel, improved methods and systems for identifying that one of a series of past events which most closely resembles a current happening.

BACKGROUND OF THE INVENTION

As in the case of humans, the optimum response of a mechanical, electromechanical, electronic, or other device to a present event can, in many cases, be optimized by taking into account the response made by the device to that historical event most closely matching a current event. Identification of the appropriate historical event can be accomplished by matching information representing the current event with information representing each of a series of past events and identifying that past event which is best correlated with the current event. A technique for doing this optically and the theory involved are described in THE FOUNDATION OF EMPIRICAL KNOWLEDGE, WITH A THEORY OF ARTIFICIAL INTELLIGENCE, Pieter J. van Heerden, N.V. Uitgeverij Wistik-Wassenaar, The Netherlands, 1968 and in U.S. Pat. Nos. 3,296,594 issued Jan. 3 1967 to van Heerden for OPTICAL ASSOCIATIVE MEMORY and 3,492,652 issued Jan. 27, 1970 to the same patentee for OPTICAL ASSOCIATIVE MEMORY SYSTEM.

SUMMARY OF THE INVENTION

We have now invented, and disclosed herein, certain new and novel methods and apparatus for carrying out this matching of functions which have the advantage that the matching of functions and identification of the past event most closely correlated with the current event can be accomplished much faster than it could be optically and with at least equal, if not greater, accuracy.

Speaking generally, this is accomplished in accord with the principles of the present invention by representing the current event and each of the past events with which the current event is to be matched by a string of binary digits. A herein described manipulation of these strings of digits is then employed to identify that past event which most closely matches the current event.

The strings of digits representing the past or historical events can be derived from that string of digits representing the current event. Alternatively, those digit strings can be derived from a binary digit string made available from a separate or independent source.

The required manipulation of the binary digits is carried out electronically. The system includes: an array of delay circuits for generating the series of binary digits representing past events from that string of digits representing the current event or the independently supplied data, circuits which function to identify that past event best correlated with the present event, and output circuitry which converts incoming information from the function matching circuitry to an optimum format. In addition, the system has switching means which allows binary digit strings to be inputted to the delay circuits from the independent source instead of inputting to those circuits the string of digits representing a current event.

Our novel information of data processing system has the advantage that it is made up of relatively uncomplicated circuit elements, that large binary digit strings can be handled, and that the requisite circuits can be provided on a single chip although this is certainly not required.

OBJECTS OF THE INVENTION

From the foregoing, it will be apparent to the reader that one primary and important object of the present invention resides in the provision of novel, improved methods and apparatus for making available to a mechanical, electromechanical, electronic, or other device information for optimizing the operation of that device.

Another primary and important object of the invention resides in the provision of methods and apparatus in accord with the preceding object in which the data inputted to the device is obtained by identifying that past event best correlated with a current event and inputting a set of data representing the thus identified historical event to the controlled device.

Still other more specific but nevertheless important objects of the invention reside in the provision of methods and apparatus in accord with the preceding object:

in which the data representing the historical event best matching the current event can be rapidly and accurately identfified;

in which, in conjuction with the preceding object, electronic data processeing is employed to identify that set of data representing the historical event best correleted with the current event;

in which the data representing past or historical events can be selectively: (1) derived from the data representing the current event, or (2) made available from an independent source.

which employ system elements that can be provided in the large numbers needed in practical applications of the invention on a single chip.

Other important objects and features and additional advantages of the invention will be apparent to the reader from the foregoing and the appended claims and as the ensuing detailed description and discussion of the invention proceeds in conjuction with the accompanying drawing.

DETAILED DESCRIPTION OF THE INVENTION

Figures 1, 1A:
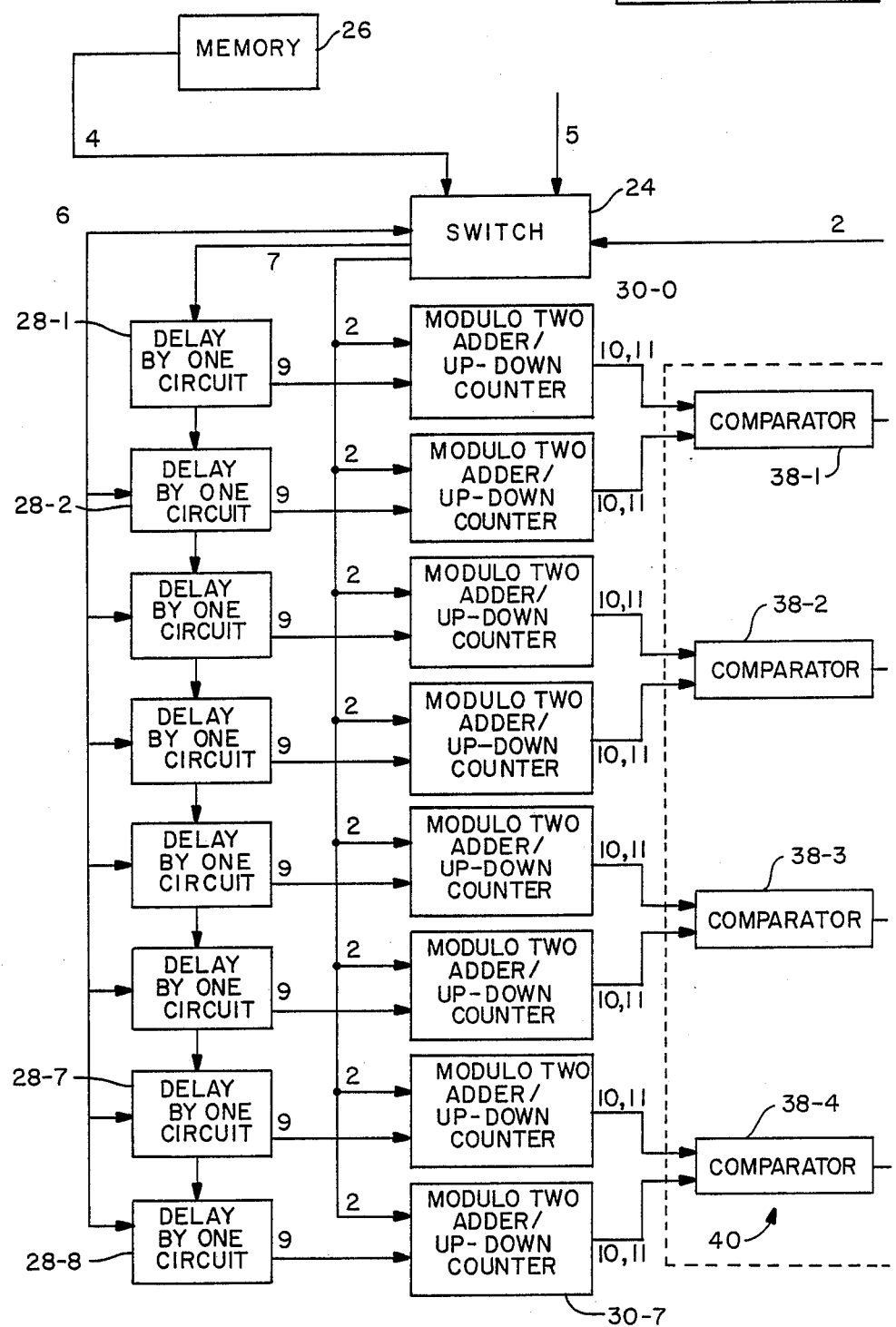
FIG. 1 shows the relationship between FIGS. 1A and 1B which, taken together, constitute a block diagram of a system embodying the principles of the present invention and designed to identify that string of binary digits representing a past or historical event which is most closely correlated with a string of binary digits representing a current event of situation.
Figure 1B:
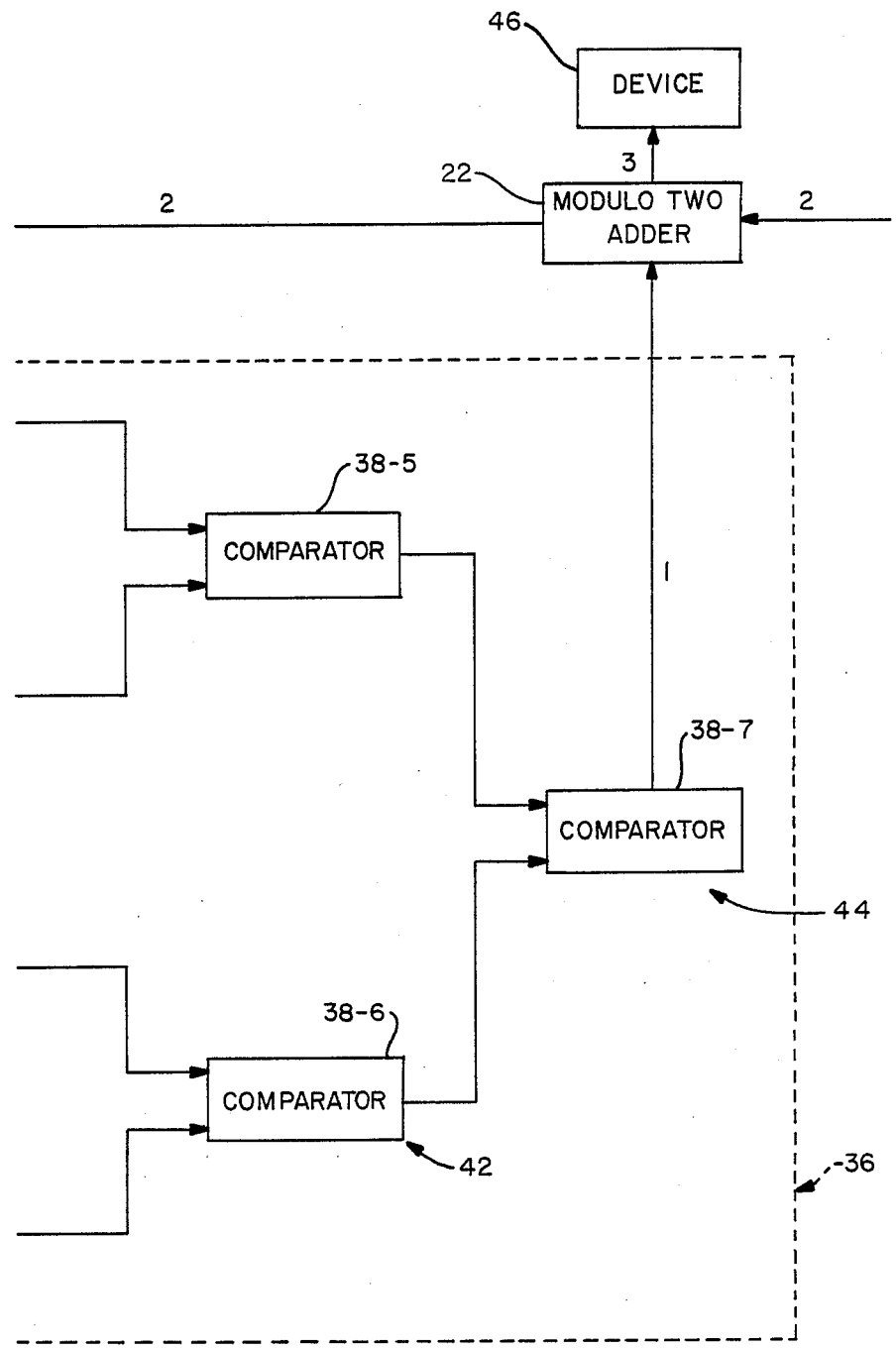

We pointed out above that an input of optimum character for a wide variety of applications can be obtained by: (1) comparing what is happening in the present with what happened at each of a number of times in the past, and (2) deriving the input from that past event which most closely matches the present happening. We also pointed out that this comparison is made by characterizing the current event and past events with strings of binary digits and by identifying that string of digits representing a past event which has the highest degree of correlation with the string of digits representing the current event or a relatively recent event. Both the current and relatively recent events are for the most part referred to as the "current event" as a matter of covenience.

The identification of that event in the past which is most closely correlated with the current event is accomplished by adding the string of digits representing the current event with the string of digits representing each of the past events. The "adding module two (modulo two)" from the of addition in which $1+1=0$, $0+0=0$, and $1+0=1$ is employed; thus, the sum of each column is either a "1" or a "0", and there is no carryover from one column to the next.

It can be shown that the sum thus obtained by modulo two adding the strings of digits representing two randomly correlated events will contain equal number of ones and zeros and that the number of excess zeros; i.e., the number of zeros in excess of the expected 50 percent will increase with the degree of correlation between the two events. Thus, by modulo two adding the string of digits representing the current event in turn to that string representing each of the past events and counting the number of excess zeros in the stringe of digits representing each resulting sum, one can identify that past event which has the highest correlation with the current event.

In many cases, the most useful result can be obtained when the binary digits representing the past events are obtained from the string of binary digits representing the current event. If the digits representing the current event are acquired at equal intervals, those strings of digits representing the past events can be obtained by writing a series of binary digit strings representing the original string repeatedly delayed by one digit; i.e., the interval at which successive integers are acquired (clock time).

The string of digits representing the current event can be represented by the function or binary time series $f(t)$ and the remaining binary digit streams, representing the related and relevant past events, by the terms $D^1f(t)$, $D^2f(t) \ldots D^kf(t)$ where k is the number of digits by which the time series $f(t)$ is delayed; i.e., $f(t-k)$. The expression "t" in the function $f(t)$ represents the number of pulses in that time-related function (or in the hereinafter discussed, time related function $g(t)$). For example, in an application in which 113 pulses (each a 0 or a 1) are required at intervals of, say, one microsecond, the string of binary digits will contain 113 integers acquired over a period of 112 microseconds, the first digit having been acquired at $t=0$.

To illustrate, $f(t)$ might be:

1110001011100010111100

In that example, $D^1f(t)$ would be:

111000101110001011110, k is 20, and the entire series of time-related functions would be the following:

TABLE 1

| | | | | | | | | | | | Time → | | | | | | | | | | | |
|---|---|---|---|---|---|---|---|---|---|---|---|---|---|---|---|---|---|---|---|---|---|---|
| | −20 | −19 | −18 | −17 | −16 | −15 | −14 | −13 | −12 | −11 | −10 | −9 | −8 | −7 | −6 | −5 | −4 | −3 | −2 | −1 | 0 |
| $f(t)$ | 1 | 1 | 1 | 0 | 0 | 0 | 1 | 0 | 1 | 1 | 1 | 0 | 0 | 0 | 1 | 0 | 1 | 1 | 1 | 0 | 0 |
| $D^1f(t)$ | | 1 | 1 | 1 | 0 | 0 | 0 | 1 | 0 | 1 | 1 | 1 | 0 | 0 | 0 | 1 | 0 | 1 | 1 | 1 | 0 |
| $D^2f(t)$ | | | 1 | 1 | 1 | 0 | 0 | 0 | 1 | 0 | 1 | 1 | 1 | 0 | 0 | 0 | 1 | 0 | 1 | 1 | 1 |
| $D^3f(t)$ | | | | 1 | 1 | 1 | 0 | 0 | 0 | 1 | 0 | 1 | 1 | 1 | 0 | 0 | 0 | 1 | 0 | 1 | 1 |
| $D^4f(t)$ | | | | | 1 | 1 | 1 | 0 | 0 | 0 | 1 | 0 | 1 | 1 | 1 | 0 | 0 | 0 | 1 | 0 | 1 |
| $D^5f(t)$ | | | | | | 1 | 1 | 1 | 0 | 0 | 0 | 1 | 0 | 1 | 1 | 1 | 0 | 0 | 0 | 1 | 1 |
| $D^6f(t)$ | | | | | | | 1 | 1 | 1 | 0 | 0 | 0 | 1 | 0 | 1 | 1 | 1 | 0 | 0 | 0 | 1 |
| $D^7f(t)$ | | | | | | | | 1 | 1 | 1 | 0 | 0 | 0 | 1 | 0 | 1 | 1 | 1 | 0 | 0 | 1 |
| $D^8f(t)$ | | | | | | | | | 1 | 1 | 1 | 0 | 0 | 0 | 1 | 0 | 1 | 1 | 1 | 0 | 1 |
| $D^9f(t)$ | | | | | | | | | | 1 | 1 | 1 | 0 | 0 | 0 | 1 | 0 | 1 | 1 | 1 | 1 |
| $D^{10}f(t)$ | | | | | | | | | | | 1 | 1 | 1 | 0 | 0 | 0 | 1 | 0 | 1 | 1 | 1 |
| $D^{11}f(t)$ | | | | | | | | | | | | 1 | 1 | 1 | 0 | 0 | 0 | 1 | 0 | 1 | 1 |
| $D^{12}f(t)$ | | | | | | | | | | | | | 1 | 1 | 1 | 0 | 0 | 0 | 1 | 0 | 1 |
| $D^{13}f(t)$ | | | | | | | | | | | | | | 1 | 1 | 1 | 0 | 0 | 0 | 1 | 1 |
| $D^{14}f(t)$ | | | | | | | | | | | | | | | 1 | 1 | 1 | 0 | 0 | 0 | 1 |
| $D^{15}f(t)$ | | | | | | | | | | | | | | | | 1 | 1 | 1 | 0 | 0 | 0 |
| $D^{16}f(t)$ | | | | | | | | | | | | | | | | | 1 | 1 | 1 | 0 | 0 |
| $D^{17}f(t)$ | | | | | | | | | | | | | | | | | | 1 | 1 | 1 | 0 |
| $D^{18}f(t)$ | | | | | | | | | | | | | | | | | | | 1 | 1 | 1 |
| $D^{19}f(t)$ | | | | | | | | | | | | | | | | | | | | 1 | 1 |
| $D^{20}f(t)$ | | | | | | | | | | | | | | | | | | | | | 1 |

In this same example, the best match between the function $f(t)$ representing the current event and the function $D^k f(t)$ representing each of the past events is obtained by modulo two adding the string of integers representing the current event to the string representing each of the pasts of that event and counting the numbers of excess zeros in each of the resulting sums. The sum is represented by the expression $(1+D^k)f(t)$; i.e., $(1+D^k)f(t)=f(t)+D^k f(t)=f(t)+f(t-k)$.

For example, and with respect to the same f(t) as was identified above:

| | |
|---|---|
| f(t) | 111000101110001011100 |
| $D^1 f(t)$ | 111000101110001011 10+ |
| $(1 + D^1)f(t)$ | 001001110010011001 0; | the expected number of zeros in the sum is 10.5; the actual number of zeros is 12; and the excess number of zeros is 1.5, indicating that there is but a slight correlation between the current event (f(t)) and the past event ($D^1 f(t)$).

Table 2 below contains the entire set of sums $(1+D)f(t)$ by modulo two addition for the particular f(t) being employed as an example:

TABLE 2

*Time in Microseconds

| | −14 | −13 | −12 | −11 | −10 | −9 | −8 | −7 | −6 | −5 | −4 | −3 | −2 | −1 | 0 |
|---|---|---|---|---|---|---|---|---|---|---|---|---|---|---|---|
| f(t) | 1 | 0 | 1 | 1 | 1 | 0 | 0 | 0 | 1 | 0 | 1 | 1 | 1 | 0 | 0 |
| (1 + D) f(t) | 1 | 1 | 1 | 0 | 0 | 1 | 0 | 0 | 1 | 1 | 1 | 0 | 0 | 1 | 0 |
| (1 + D²) f(t) | 0 | 1 | 0 | 0 | 1 | 1 | 1 | 0 | 0 | 1 | 0 | 0 | 1 | 1 | 1 |
| (1 + D³) f(t) | 1 | 1 | 1 | 1 | 0 | 1 | 0 | 1 | 1 | 1 | 1 | 0 | 1 | 0 | 1 |
| (1 + D⁴) f(t) | 1 | 0 | 0 | 1 | 1 | 0 | 0 | 1 | 1 | 0 | 0 | 1 | 1 | 0 | 1 |
| (1 + D⁵) f(t) | 0 | 1 | 1 | 1 | 1 | 0 | 1 | 0 | 1 | 1 | 1 | 1 | 1 | 1 | 0 |
| (1 + D⁶) f(t) | 0 | 1 | 0 | 1 | 1 | 0 | 1 | 0 | 0 | 1 | 0 | 1 | 1 | 0 | 1 |
| (1 + D⁷) f(t) | 0 | 1 | 0 | 0 | 1 | 0 | 0 | 1 | 1 | 1 | 0 | 1 | 0 | 0 | 0 |
| (1 + D⁸) f(t) | 1 | 0 | 0 | 0 | 0 | 0 | 0 | 0 | 0 | 0 | 0 | 0 | 0 | 0 | 0 |
| (1 + D⁹) f(t) | | 0 | 0 | 0 | 1 | 0 | 0 | 1 | 1 | 1 | 0 | 0 | 1 | 0 |
| (1 + D¹⁰) f(t) | | | 0 | 0 | 1 | 1 | 0 | 1 | 0 | 0 | 1 | 0 | 1 | 1 |
| (1 + D¹¹) f(t) | | | | 0 | 1 | 1 | 1 | 1 | 0 | 1 | 0 | 1 | 1 | 1 |
| (1 + D¹²) f(t) | | | | | 1 | 1 | 1 | 0 | 0 | 1 | 1 | 0 | 0 | 1 |
| (1 + D¹³) f(t) | | | | | | 1 | 1 | 0 | 1 | 1 | 1 | 1 | 1 | 0 |
| (1 + D¹⁴) f(t) | | | | | | | 1 | 0 | 1 | 0 | 1 | 1 | 0 | 1 |
| (1 + D¹⁵) f(t) | | | | | | | | 0 | 1 | 0 | 0 | 1 | 0 | 0 |
| (1 + D¹⁶) f(t) | | | | | | | | | 1 | 0 | 0 | 0 | 0 | 0 |
| (1 + D¹⁷) f(t) | | | | | | | | | | 0 | 0 | 0 | 1 | 0 |
| (1 + D¹⁸) f(t) | | | | | | | | | | | 0 | 0 | 1 | 1 |
| (1 + D¹⁹) f(t) | | | | | | | | | | | | 0 | 1 | 1 |
| (1 + D²⁰) f(t) | | | | | | | | | | | | | 1 | 1 |
| (1 + D²¹) f(t) | | | | | | | | | | | | | | 0 | 1 |

*In this example, one microsecond is the interval between succeeding pulses

In this particular example, the highest correlation with the current event is between it and the past event represented by the function $D^8 f(t)$. In particular: $(1+D^8)f(t)=[f(t)+f(t-8)]$ has 14 digits. The average number of digits is therefore 7, the actual number of zeros is 13, and the excess number of zeros is $13-7=6$. This is an almost perfect correlation as the maximum possible number of zeros for a binary string with 14 integers is 7 (identical series). In other words, the more nearly the actual number of excess zeros approaches the theoretical number, the higher the degree of correlation there is between the two functions.

It will be remembered that it is the best correlated function $D^{ko}f(t)$ that is wanted as an output, not the sum of that function and f(t) shown in Table 2; i.e., $(1+D^{ko})f(t)$. Once the closest correlation is found, $D^{ko}f(t)$ can easily and surprising be obtained by adding the related sum $(1+D^{ko})f(t)$ to the original function f(t) because:

$$(1+D^{ko})f(t)+f(t)=$$

$$f(t)+D^{ko}f(t)+f(t),\ \text{and}$$

$$f(t)+f(t)+D^{ko}f(t)=D^{ko}f(t)$$

inasmuch as $f(t)+f(t)$ always equals zero because the terms in f(t) are the same and must be a zero or one, and $1+1=0$ and $0+0=0$ (these are the two possibilities in adding the like integers together).

Those skilled in the arts to which this invention relates will of course appreciate that the string of digits employed above as an example to represent an event is very much simpler than will typically be the case in actual practice. In an actual case, the string representing the current event may be several tens of thousands or even several hundreds of thousands of digits long. The duration of the intervals between the acquisition of digits may be measured in microseconds as in the example; but the duration of the interval may be longer or shorter. The several intervals between the acquisition of digits may be of equal, or different, durations. Therefore, it is not intended that the foregoing example be construed as a limit on the scope of protection sought in the appended claims.

Referring now to the drawing, FIG. 1 depicts a system 20 for identifying that one of a series of past or historical events which has the highest degree of correlation with a current (or recent) event in accord with the principles of the present invention. For purposes of discussion, it will first be assumed that the event with which the correlation is being made is a current event which can be represented by the expression or function f(t) and presented as a string of sequentially acquired binary digits. This string, identified as 2 in FIG. 1, is routed first to a modulo two adder 22 and then to a switch 24 which is employed to pass either: (a) the string 2 of binary digits, or (b) a string of binary digits 4 stored in a memory 26.

The output from switch 24, identified by reference character 7, is transmitted to the first (28-1) of a series of delay-by-one circuits 28-1 ... 28-k with the output from each delay-by-one circuit 28 being inputted to the next in the series of delay-by-one circuits 28. These circuits therefore generate the strings of binary digits representing those several events $D^1f(t), D^2f(t) \ldots D^kf(t)$ in the past history of the current event related by the function $f(t)$.

Downstream from delay circuits 28 is a serially arranged set of circuits 30-0 ... 30-7. Each of these circuits includes a modulo two adder 32 and an up/down counter 34 (see FIG. 2).

In each of the modulo two adders 30-0 ... 30-7, the binary string of digits representing the current event-related function $f(t)$ is added by modulo two addition to the string of binary digits outputted from an associated delay-by-one circuit 28 and representing a past or historical event $D^1f(t), D^2f(t) \ldots D^kf(t)$ to form the binary digit strings representing the sums $(1+D^1)f(t)$, $(1+D^2)f(t) \ldots (1+D^2)f(t)$. The up/down counter 34 in each circuit 30 then counts the number of excess zeros in the binary digit string representing the sum $(1+D)f(t)$ generated in its associated modulo two adder. The output from each circuit 30 thus contains: (1) a string of binary digits 10 representing the sum $(1+D)f(t)$ generated in the modulo two adder 32 of that circuit, and (2) data (binary digit string) representing the number of excess zeros in that sum as counted in the up/down counter 34 of the circuit.

Next in the exemplary system 20 depicted in FIG. 1 of the drawing is a single elimination array 36 of comparators 38-1 ... 38-7. These comparators are arranged in three tiers or levels 40, 42, and 44.

The comparators 38-1 ... 38-4 in the first level 40 are inputted from an adjacent pair of modulo two adder, up/down counter circuits 30. Thus, the number of comparators 38 in the first or initial level 40 is one-half the number of circuits 30.

Each comparator 38 in the second and any subsequent level is inputted from an adjacent pair of comparators 38 in the preceding level so that each subsequent level has one-half the number of comparators in the preceding level with the final level having a single comparator 38-7.

Each comparator 38 in the first level 40 identifies that one of the sums $(1+D)f(t)$ represented by the binary digit strings inputted to it which has the larger number of excess zeros and outputs that information. Comparator 38-1 in the illustrated circuit, for example, determines whether the binary digit string representing the sum $(1+D^1)f(t)$ or that binary digit string representing $(1+D^2)f(t)$ has the larger number of excess zeros while comparator 38-4 in level 1 similarly ascertains whether the binary digit string representing the past event-related function $(1+D^{k-1})f(t)$ or the past event-related function $(1+D^k)f(t)$ has the larger number of excess zeros and outputs that information.

From each comparator 38-1 . . . 38-4, the winner—i.e., the binary digit string with the larger number of excess zeros—advances to the next, intermediate level 42 of comparators 38. In this second, and each succeeding, level in comparator array 36, each comparator 38 is inputted from an adjacent pair of comparators 38 in the preceding level. Thus, in the illustrated system 20, the outputs from the comparators 38-1 and 38-2 in the first level 40 are inputted to the comparator 38-5 in the second level 42; and the outputs from the first level comparators 38-3 and 38-4 are inputted to the second level comparator 38-6.

As in the first level, the winner from each second level comparator—i.e., the binary digit string with the larger number of excess zeros—is advanced to the next level of comparators, in this case, final or output level 44 with its single comparator 38-7. Therefore outputted from comparator 38-7 is the sum of the current event-related function $f(t)$ and that one of the functions $(1+D^{ko})f(t)$ in the historical past of function $f(t)$ which is most closely correlated with function $f(t)$.

This string of binary digits, identified by reference character 1 in FIG. 1, is inputted to modulo two adder 22 where the string of binary digits 2 representing the current event-related function $f(t)$ is added by modulo two addition to the string 1 of modulo two digits. Thus, binary adder 22 outputs that string of binary digits identified by reference character 3. This string of binary digits is of course the one representing that historical event-related function $D^{ko}f(t)$ which has the highest degree of correlation with the current event-related function $f(t)$. The signal outputted from modulo two adder 22 in the form of a string of binary digits can therefore be employed to advantage to optimize the performance of the mechanical, electrical, mechanical, electronic, or other device identified in FIG. 1 by reference character 46.

The delay-by-one circuits 28 employed to generate the past event-related functions $Df(t)$ may be D-type flip-flops as described in ELECTRONIC CIRCUITS, Holt, John Wiley & Sons, New York, NY, section 9-4, pages 263–266, 1978.

One representative circuit 30 in which binary adder 32 and up/down counter 34 are related in the manner discussed above is illustrated in FIG. 2. The up/down counter is mudo two conventional as is adder 32, which contains circuits for performing the exclusive-OB operation $A+B=(A\ B)\ (\overline{A}\ \overline{B})$. The strings of binary digits 2 and 9 representing: (1) the current event-related function $f(t)$, and (2) a past event-related function $D^kf(t)$ are inputted to a modulo two adder 32, which consequently outputs a string 10 of binary digits representing the sum $(1+D^k)f(t)$. This output is supplied to the input side of up/down counter 34. It is also supplied to the input side of that comparator 38 in the initial tier or level 40 of comparator array 36 to which the particular circuit 30 is serially connected (see FIG. 1).

Also inputted to the up/down counter 34 are two additional signals identified by reference characters 6 and 8 in FIG. 1. These are respectively a clock signal and a signal for resetting counter 34 to zero. Both are conventional. The up/down counters 34 in the several mudo two adder/counter circuits 30 may be reset simultaneously—for example, at selected time intervals—or individually as the capacity of each counter 34 is reached.

As discussed above, the output from the up/down counter 34 is a set of data 11 identifing the number of excess zeros in the function $(1+D)f(t)$ generated by the modulo two adder 32 of a particular circuit 30.

Figure 3:
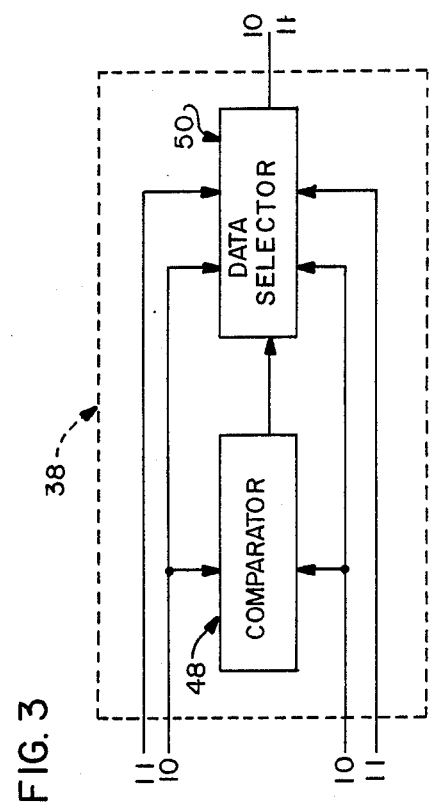
FIG. 3 is a schematic of one of several identical comparator circuits employed in the system of FIG. 1 in a multilevel, single elimination array to identify that sum-representing string of digits having the greatest number of excess zeros by comparing successive pairs of the sum-representing strings of digits.

Turning now to FIG. 3, the comparators 38 employed in system 20 are equally conventional. Each includes a known comparator circuit 48 and an equally conventional data selector 50. The comparator 48 and data selector 50 identify, and output, that string 10 of binary digits representing a winning sum $(1+D^k)f(t)$ and the string 11 of binary digits identifying the number of excess zeros in the sum $(1+D^k)f(t)$. It is to be noted, in this respect, that both the string 10 and the string 11 of binary digits are needed as outputs. It is the ultimate, winning string 10 of digits that is formated into the output from system 20 whereas the string 11 of binary digits represents the number of excess zeros in binary digit string 10 and is, therefore, a measure of the degree of correlation between a given, historical event-related function $(1+D)f(t)$ and the current event-representing function $f(t)$.

Figure 4:
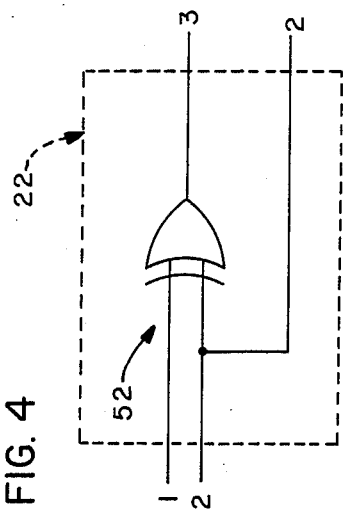
FIG. 4 is a schematic of a circuit employed in the system of FIG. 1 to: (a) convert the string of binary digits obtained by modulo two adding the strings representing the current and best correlated past events to the string of digits representing the best correlated historical event, and (b) output the latter string of digits from the system.
Figure 2:
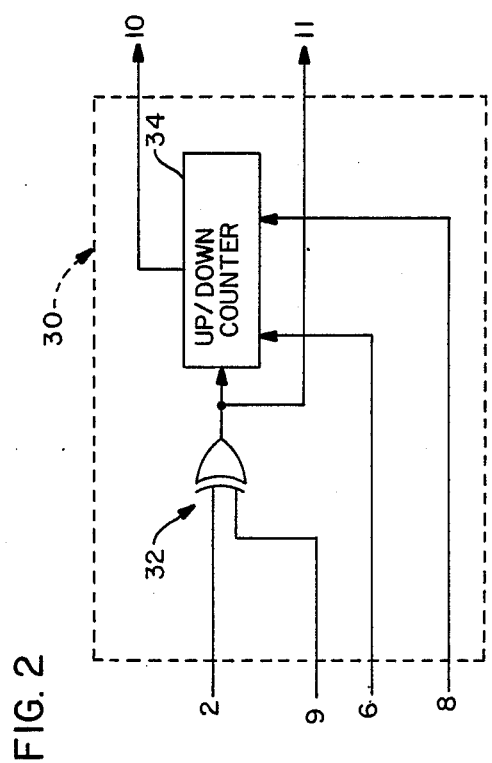
FIG. 2 is a schematic of one of several identical circuits employed in the system of FIG. 1 to: (a) add the string of digits representing the current event to each of the strings of digits representing past events by modulo two addition, and (b) identify the number of excess zeros in each of the resulting sum-representing strings of digits, the number of excess zeros being indicative of the degree of correlation between the current and past events.

Modulo two adder 22, shown in FIG. 4, includes circuits collectively identified by reference character 52 and typically of the same character as those identified by reference character 32 in FIG. 2. As discussed above, modulo two adder 22 is employed to add the string 2 of binary digits representing the current event-related function $f(t)$ to that string 1 of binary digits representing the past event-related function $D^{ko}f(t)$ bearing the highest degree of correlation to function $f(t)$ modulo two. The resulting sum is that above-discussed string of binary digits (identified by reference character 3 in FIG. 4) which represents the winning function $D^{ko}f(t)$ and is outputted from system 20.

Figure 5:
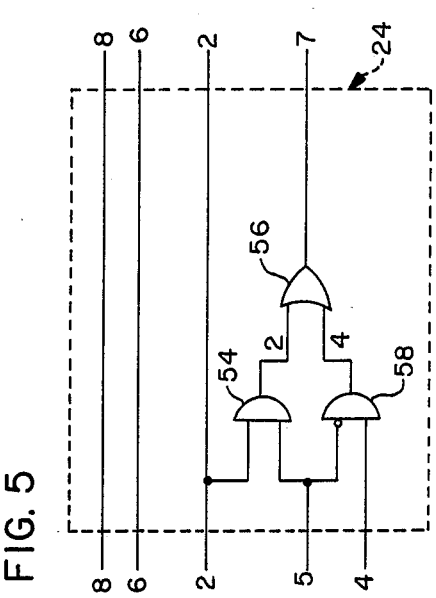
FIG. 5 is a schematic of a switching circuit which is incorporated in the system of FIG. 1 and allows data representing historical events to be derived from data inputted from an independent source instead of being derived from the data representing the current event.

The final major component of system 20, selector switch 24, is shown in detail in FIG. 5. In that figure, reference character 5 represents a single which is assumed to be: (1) present, that is 1111 ... etc., if a match is to be made between a function of the character discussed above and identified by the expression $f(t)$ and the functions $D^k f(t)$ representing the past history of that event, and (2) absent, that is 0000 ... etc., if, instead, the match is to be made between the function $f(t)$ and past events related to a function $g(t)$ available from memory 26. These events in the history of function $g(t)$ are identified as $D^1 g(t), D^2 g(t) \ldots D^k g(t)$.

As is shown in FIG. 5, the binary digit string 2 representing $f(t)$ is routed to switch 24 includes three gates 54, 56, and 58. In the first case, gate, 54, an "AND gate" will always output $f(t)$, whether $f(t)$ is a "1" or a "0", while at the same time gate 58, an "AND gate" with inputs 000 ... etc. and $g(t)$, will always output a "0". The "OR gate" 56 will therefore always output $f(t)$ because it is inputted from the two parallel AND gates 54 and 56. Conversely, if switching signal 5 is 000 ... etc., gate 54 will always output a "0", while "AND gate" 58, for which the input is now 111 ... etc. and $g(t)$, will always output $g(t)$, and therefore the "OR gate" 56 now will always output $g(t)$. With either input of gate 56 active, a stream of binary digits representing either the current event-related function $f(t)$ (signal 5 present) or a binary stream of digits available from memory and representing a function $g(t)$ (signal 5 absent) is outputted from OR gate 56 as indicated by reference character 7 in FIG. 5. In both cases the operation of the system is the same except that, if the function $g(t)$ is selected from memory 26: (1) it is the binary digit strings representing functions $D^1 g(t), D^2 g(t) \ldots D^k g(t)$ that are generated in delay-by-one circuits 28, and (2) it is the past event-related function $D^{ko}g(t)$ most closely correlated to current event-related function $f(t)$ that is outputted from system 20.

The mode of operation employing memory 26 may be used, for example, to determine whether there is available from images stored in memory 26, for instance as in TV pictures of hundred lines of 200 binary digits each, scanned successively, and therefore represented by segments of 20000 binary digits each, and image similar to that image represented by the string 2 of binary digits. In this scenario, the image available at 2 (the current event) is represented by the function $f(t)$, and the images stored in memory (the past events) are represented by the functions $g_1 f(t), g_2 f(t) \ldots g_r f(t)$ where the expression "r" represents the number of images stored in memory 26. The degree of correlation between the function $f(t)$ and the functions $g(t), D^1 g(t), D^2 g(t) \ldots D^k g(t)$ for each of the images represented by a function $g(t)$ is ascertained and the correlations compared in system 20 in the manner discussed above. The function $g(t)$ or $D^k g(t)$ with the highest degree of correlation will thus be the one related to that image which most closely resembles the image represented by the function $f(t)$. It may be that the recognizable part in the TV picture of the example, call it $g_r(t)$, although of exactly the same dimensions, is displaced with respect to the part to be recognized in $f(t)$, vertically and horizontally. This simply means that some $D^k g(t)$ will provide the exact match with the digits of the image to be recognized and therefore will emerge as the winner.

The best match between the current image and those created in the past may be between two images in which one element of the image (or the entire image) is shifted to different coordinates. This contingency is easily provided for. For example, memory may hold multiple images, each represented by a string of k binayr digits. The best match between the current and past event-related functions, taking shifted image and image elements into account, will be found by modulo two adding with the terms of $f(t)$ all members of each set $g(t)$, $D^1 g(t), D^2 g(t) \ldots D^k g(t)$ and then identifying that resulting sum $(1+D)g(t)$ with the largest number of excess zeros.

As discussed above, and depending upon the particular application of the invention, it may be that event in the more recent past of a current event represented by $f(t)$ having the highest degree of correlation with an event in the more distant past of the current event or an event in the past of a current event represented by $g(t)$ that can most usefully by outputted from the modulo two adder 22 of system 20. In this case, the function with which the correlation is to be made can be identified as $D^m f(t)$, the historical past of $f(t)$ as $D^{m+1}f(t)$, $D^{m+2}f(t) \ldots D^k f(t)$, and the past of $g(t)$ by the same series $D^1 g(t), D^2 g(t) \ldots D^k g(t)$ as was set forth above. The term "m" will typically be 1 or another small number, but it may be any number smaller than k.

It will be obvious to those skilled in the arts to which this invention relates that those just-discussed implementations of the invention can be carried out in system 20 as easily as those in which it is the current event related by the function $f(t)$ with which the correlation is to be made. The only essential differences are that: (1) the string 2 of modulo two digits inputted to the first of the serially connected binary adders 30-0 is the string representing $D^m f(t)$, and (2) the strings inputted to the remaining ones of the modulo two adders 30-1 ... 30-K represent the functions $D^{m+1}f(t), D^{m+2}f(t) \ldots D^k f(t)$ (or $D^1 g(t), D^2 g(t) \ldots D^k g(t)$).

The information embodied in those strings of binary digits representing the functions $f(t)$ and $g(t)$ and the historical pasts of those functions—$D^1 f(t), D^2 f(t) \ldots D^k f(t)$ and $D^1 g(t), D^2 g(t) \ldots D^k g(t)$—may be of the same type or of many different types. For example in the case of a robot designed to emulate human responses, $f(t)$ might be composed of information representing: analogs of human drives $F_1(t)$, sensory inputs $f_2(t)$, and muscular responses $f_3(t)$ with $f(t)$ representing short, regularly alternating, segments of $f_1(t), f_2(t)$, and $f_3(t)$.

In many cases, the device 46 to which data is outputted from system 20 wil be computer controlled. In these applications, system 20 has the advantage that its output is in binary form, facilitating the acquisition of the outputted data by the device controlling computer(s).

Other applications require, or can at least more easily utilize, an input in analog form. In those applications, a conventional D/A (digital-to-analog) converter can be employed to convert the data outputted from system 20 to the more useful, or required, analog form.

It is also to be understood that the term "device" has been used above in a very loose sense. The "device" with a modus operandi controlled (at least in part) by data inputted to it in accord with the principles of the present invention may be a very simple one or that which is controlled may be a complex system.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which came within the meaning and range of equivalency of the claims are thereofre intended to be embraced therein.

What is claimed is:

1. A system for generating a set of data which can be inputted to a mechanical, electromechanical, electronic, or other device to control the operation of the device, said system comprising:
   a. an array of function comparing means for comparing by modulo two addition a function $f(t)$ representing a current event and presented as a string of binary digits to each of a series of functions $D^1f(t)$, $D^2f(t) \ldots D^kf(t)$ representing past or historical events and similarly presented to thereby generate a series of binary digit strings representing the series of sums $(1+D^1)f(t)$, $(1+D^2)f(t) \ldots (1+D^k)f(t)$;
   b. a multiplicity of comparators arrayed in multiple levels with: the comparators in the first and any intermediate levels arrayed in parallel, the comparators in each level except for the first level having as inputs the outputs from an adjacent pair of comparators in the preceding level, their being a single comparator in the final level, each comparator in the first level having as inputs the outputs from two of said function comparing means which generate successive ones of said series of sums, and each said comparator comprising means for identifying and outputting that one of the two inputted string of binary digits having the greater number of excess zeros where the number of excess zeros in a sum-associated string of digits is that number of zeros which exceeds one-half of the number of digits in the string, whereby the string outputted from the comparator in the final level of the comparator array will be the string of binary digits with the largest number of excess zeros; and
   c. means for comparing the string of digits representing the function $f(t)$ to the string of digits with largest number of excess zeros by modulo two addition and for outputting the resulting string of digits from the system.

2. A system as defined in claim 1 which includes means for generating the functions $D^1f(t)$, $D^2f(t) \ldots D^kf(t)$ in the form of binary digit strings from the function $f(t)$ and for outputting the thus generated binary digit strings to said function comparing means.

3. A system as defined in claim 2 which has multiple inputs and switching means which can be utilized to connect a selected one of said multiple inputs to said array sum of function comparing means.

4. A system as defined in claim 1 which has an up/down counter between each of the function comparing means in said array and the computer to which that function comparing means outputs the sum generated thereby for ascertaining the number of excess zeros in the string of binary digits representing said sum.

5. A system as defined in claim 1 which has means for enabling said array of function comparing means to accept binary digit strings from which the past event-related functions $D^1g(t)$, $D^2g(t) \ldots D^kg(t)$ can be generated from a source independent of the current event-related function $f(t)$.

6. A system as defined in claim 1 in which said function comparing means and said comparators also comprise means for determining which of the past event-related functions $D^kf(t)$ in the more distant past of a current event has the highest degree of correlation with an event in the more recent past of the event or with independently acquired historical events and outputting the string of binary digits representing the thus determined, most highly correlated event.

7. A method of identifying and making available as a string of binary digits that one of a series of historical event-related functions $D^1f(t)$, $D^2f(t) \ldots D^kf(t)$ which has the highest degree of correlation with a function $f(t)$ representing a current event or situation, said method comprising the steps of:
   a. presenting said historical event-related and current event-related functions as strings of binary digits; and
   b. employing an electronic data processing system to:
      (i) add the string of binary digits representing the function $f(t)$ to each of the binary digit strings representing a historical event-related function $D^1f(t)$, $D^2f(2) \ldots D^kf(t)$ in the modulo two form of addition to thereby produce strings of binary digits representing the resulting sums $(1+D^1)f(t)$, $(1+D^2)f(t) \ldots (1+D^k)f(t)$,
      (ii) determine the excess number of zeros in each string of binary digits representing a sum $(1+D^1)f(t)$, $(1+D^2)f(t) \ldots (1+D^k)f(t)$ where the number of excess zeros in each sum-representing string of digits is the number of zeros in the string in excess of one-half of the total number of digits in the string;
      (iii) compare the number of excess zeros in those binary digit strings representing the sums $(1+D^1)f(t)/(1+D^2)f(t)$ . . . $(1+D^{k-1})f(t)/(1+D^k)f(t)$ of current event-representing function $f(t)$ and adjacent function pairs $D^1f(t)/D^2f(t) \ldots D^{k-1}f(t)/D^kf(t)$ and pairs of strings thus determined to have the larger number of excess zeros through the number of levels required to identify that binary digit string with the largest number of excess zeros; and
      (iv) output as representative of the past event-related function having the highest degree of correlation with the current event-related function that string of binary digits representing a sum $(1+D^1)f(t) \ldots (1+D^k)f(t)$ and having the largest number of excess zeros.

8. A method as defined in claim 7 which includes the step of deriving each of the past event-representing functions $D^1f(t)$, $D^2f(t) \ldots D^kf(t)$ from the current event-representing function $f(t)$.

9. A method as defined in claim 8 which includes the step of acquiring the binary digits representing the current event-related function $f(t)$ successively, the step of employing as the string of binary digits representing the first past event-representing function $D^1f(t)$ the string representing the function $f(t)$ less the last acquired digit in that string, and the step of employing as each succeeding function $Df(t)$ a string of binary digits which is the same as the preceding string less the most recently acquired digit present in the latter.

10. A method as defined in claim 7 which includes the step of deriving the strings of binary digits representing each of the past event-related functions from data acquired from a source independent of that string of digits representing the current event-related function $f(t)$.

11. A method of providing a set of data for optimizing the operation of a mechanical, electromechanical, electronic, or other device which includes the steps of:
   a. identifying and making available a string of binary digits representing the sum $(1+D^k)f(t)$ of a current event-related function $f(t)$ and that one of a series of historical event-related functions $D^1f(t), D^2f(t) \ldots D^kf(t)$ having the highest degree of correlation with the function $f(t)$ by presenting said historical event-related and current event-related functions as strings of binary digits and employing an electronic data processing system to:
      (i) add the string of binary digits representing the function $f(t)$ to each of the binary digit strings representing a historical event-related function $D^1f(t), D^2f(2) \ldots D^kf(t)$ in the modulo two form of addition to thereby produce strings of binary digits representing the resulting sums $(1+D^1)f(t), (1+D^2)f(t) \ldots (1+D^k)f(t)$;
      (ii) determine the excess number of zeros in each string of binary digits representing a sum $(1+D^1)f(t), (1+D^2)f(t) \ldots (1+D^k)f(t)$ where the number of excess zeros in each sum-representing string of digits is the number of zeros in the string in excess of one-half of the total number of digits in the string; and
      (iii) compare the number of excess zeros in those binary digit strings representing the sums $(1+D^1)f(t)/(1+D^2)f(t)$ . . . $(1+D^{k-1})f(t)/(1+D^k)f(t)$ of current event-representing function $f(t)$ and adjacent function pairs $D^1f(t)/D^2f(t) \ldots D^{k-1}f(t)/D^kf(t)$ and pairs of strings thus determined to have the larger number of excess zeros through the number of levels required to identify that binary digit string $(1+D^{ko})f(t)$ with the largest number of excess zeros;
   b. adding the strings of digits representing the current event-related function $f(t)$ to the strings of digits representing the aforesaid sum $(1+D^{ko})f(t)$ to thereby obtain the string of binary digits representing that historical event-related function having the highest degree of correlation with the function $f(t)$, and
   c. outputting to the device the string of binary digits representing the historical event with the highest degree of correlation to the current event and obtained as specified in step b. above.

12. A method of identifying and making available that one of a series of historical event-related functions $D^{m+1}f(t), D^{m+2}f(t) \ldots D^kf(t)$ which has the highest degree of correlation with a function $D^mf(t)$ representing a more recent past of a current event or situation that can be represented by the function $f(t)$, m being smaller than k and said method comprising the steps of:
   a. presenting said historical event-related and recent event-related functions as strings of binary digits; and
   b. employing an electronic data processing system to:
      (i) add the string of binary digits representing the function $D^mf(t)$ to each of the binary digit strings representing a function $D^{m+1}f(t), D^{m+2}f(t) \ldots D^kf(t)$ in the module add two form of addition to thereby produce strings of binary digits representing the resulting sums $(1+D^{m+1})f(t), (1+D^{m+2})f(t) \ldots (1+D^k)f(t)$;
      (ii) determine the excess number of zeros in each string of binary digits representing a sum $(1+D^{m+1})f(t), (1+D^{m+2})f(t) \ldots (1+D^k)f(t)$ where the number of excess zeros in each sum representing string of digits is the number of zeros in the string in excess of one-half of the total number of digits in the string;
      (iii) compare the number of excess zeros in those binary digit strings representing the sums $(1+D^{m+1})f(t)/(1+D^{m+2})f(t)$ . . . $(1+D^{k-1})f(t)/(1+D^k)f(t)$ of recent event-related function $D^mf(t)$ and adjacent function pairs $(D^{m+1})f(t)/(D^{m+2})f(t)$ . . . $(D^{k-1})f(t)/(D^k)f(t)$ and pairs of strings thus determined to have the larger number of excess zeros through the number of levels required to identify that binary digit string with the largest number of zeros; and
      (iv) provide as the past event-related function having the highest degree of correlation with the recent event-related function that past event-representing string of binary digits having the largest number of excess zeros.

13. A method of providing a set of data for optimizing the operation of a mechanical, electromechanical, electronic, or other device which includes the steps of:
   a. identifying and making available a string of binary digits representing the sum $(1+D)f(t)$ of a recent event-related function $D^mf(t)$ and that one of a series of historical event-related functions $D^{m+1}f(t), D^{m+2}f(t)$ in which m is smaller than k having the highest degree of correlation with the function $D^mf(t)$ by presenting said historical event-related and current event-related functions as strings of binary digits and employing an electronic data processing system to:
      (i) add the string of binary digits representing the function $D^mf(t)$ to each of the binary digit strings representing a function $D^{m+1}f(t), D^{m+2}f(t) \ldots D^kf(t)$ in the modulo two form of addition to thereby produce strings of binary digits representing the resulting sums $(1+D^{m+1})f(t), (1+D^{m+2})f(t) \ldots (1+D^k)F(t)$;
      (ii) determine the excess number of zeros in each string of binary digits representing a sum $(1+D^{m+1})f(t), (1+D^{m+2})f(t) \ldots (1+D^k)f(t)$ where the number of excess zeros in each sum representing string of digits is the number of zeros in the string in excess of one-half of the total number of digits in the string; and
      (iii) compare the number of excess zeros in those binary digit strings representing the sums $(1+D^{m+1})f(t)/(1+D^{m+2})f(t)$ . . . $(1+D^{k-1})f(t)/(1+D^k)f(t)$ of recent event-related function $D^mf(t)$ and adjacent function pairs $D^{m+1}f(t)/D^{m+2}f(t) \ldots (D^{k-})f(t)/D^kf(t)$ and pairs of strings thus determined to have the larger number of excess zeros through the number of levels required to identify that binary digit string $(1+D)f(t)$ with the largest number of zeros;

b. adding the strings of digits representing the recent event-related function $D^m f(t)$ to the string of digits representing the aforesaid sum $(1+D)f(t)$ having the highest degree of correlation with the recent event-related function $D^m f(t)$ by modulo two addition to thereby obtain the string of binary digits representing that historical event-related function having the highest degree of correlation recent event-related with the function $D^m f(t)$; and c. outputting to the device the string of binary digits representing the historical event with the highest degree of correlation to the current event and obtained as specified in step b. above.

* * * * *